(12) United States Patent
Wood

(10) Patent No.: US 8,985,531 B2
(45) Date of Patent: Mar. 24, 2015

(54) METHODS FOR SYSTEM COMPONENT INSTALLATION UTILIZING DIRECT MANUFACTURED COMPONENTS

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 1884 days.

(21) Appl. No.: 11/691,711

(22) Filed: Mar. 27, 2007

(65) Prior Publication Data

US 2008/0243455 A1 Oct. 2, 2008

(51) Int. Cl.
*F16L 3/22* (2006.01)
*F16L 3/237* (2006.01)
*B22F 3/105* (2006.01)
*B29C 67/00* (2006.01)
*F16L 55/035* (2006.01)

(52) U.S. Cl.
CPC ............... *F16L 3/237* (2013.01); *B22F 3/1055* (2013.01); *B29C 67/0077* (2013.01); *F16L 55/035* (2013.01)
USPC ........... 248/68.1; 248/74.4; 248/67.5; 174/93

(58) Field of Classification Search
USPC ........ 248/55, 68.1, 74.4, 67.5, 67.7, 73, 74.3, 248/49, 65; 174/93
See application file for complete search history.

(56) References Cited

U.S. PATENT DOCUMENTS

| | | | | |
|---|---|---|---|---|
| 2,288,158 A * | 6/1942 | Ellinwood | | 174/135 |
| 2,354,919 A * | 8/1944 | Lockwood | | 248/68.1 |
| 2,355,742 A * | 8/1944 | Morehouse | | 248/68.1 |
| 2,361,943 A * | 11/1944 | Issoglio et al. | | 174/135 |
| 2,362,124 A * | 11/1944 | Ellinwood | | 174/135 |
| 2,417,260 A * | 3/1947 | Morehouse | | 174/135 |
| 3,023,989 A * | 3/1962 | White | | 248/68.1 |
| 3,856,244 A * | 12/1974 | Menshen | | 248/67.5 |
| T100,605 I4 * | 5/1981 | Christian | | 248/68.1 |
| 4,457,249 A | 7/1984 | Disen | | |
| 4,595,162 A * | 6/1986 | Matsumura et al. | | 248/68.1 |
| 4,965,027 A | 10/1990 | Takahashi | | |
| 5,024,405 A | 6/1991 | McGuire | | |
| 5,098,047 A * | 3/1992 | Plumley | | 248/68.1 |
| 5,133,523 A | 7/1992 | Daigle et al. | | |

(Continued)

FOREIGN PATENT DOCUMENTS

| | | |
|---|---|---|
| EP | 1151849 A1 | 7/2001 |
| EP | 1384565 A1 | 1/2004 |
| WO | 2004022319 A1 | 3/2004 |

OTHER PUBLICATIONS

International Search Report and Written Opinion of PCT/US2008/058359; Feb. 19, 2009; 13 pages.

(Continued)

*Primary Examiner* — Terrell McKinnon
*Assistant Examiner* — Michael McDuffie
(74) *Attorney, Agent, or Firm* — Armstrong Teasdale LLP

(57) ABSTRACT

A method for fabricating a structure to include at least a portion of a conduit retention system is described. The method includes receiving parameters for the structure and the portion of the conduit retention system associated with the structure via a user interface, providing the parameters to a machine configured to fabricate the structure and incorporate the portion of the conduit retention system, the machine using a direct manufacturing process, and operating the machine to integrally fabricate the structure and the portion of the conduit retention system.

12 Claims, 4 Drawing Sheets

(56) References Cited

U.S. PATENT DOCUMENTS

| | | | | |
|---|---|---|---|---|
| 5,377,939 | A | * | 1/1995 | Kirma .................. 248/68.1 |
| 5,393,613 | A | | 2/1995 | MacKay |
| 5,494,245 | A | * | 2/1996 | Suzuki et al. ............ 248/74.1 |
| 5,746,844 | A | | 5/1998 | Sterett et al. |
| 5,794,897 | A | * | 8/1998 | Jobin et al. .............. 248/74.4 |
| 5,837,960 | A | | 11/1998 | Lewis et al. |
| 5,993,554 | A | | 11/1999 | Keicher et al. |
| 6,105,907 | A | | 8/2000 | Komsitsky |
| 6,173,926 | B1 | * | 1/2001 | Elvegaard ............... 248/74.1 |
| 6,391,251 | B1 | | 5/2002 | Keicher et al. |
| 6,656,409 | B1 | | 12/2003 | Keicher et al. |
| 6,811,744 | B2 | | 11/2004 | Keicher et al. |
| 6,902,138 | B2 | * | 6/2005 | Vantouroux ............. 248/68.1 |
| 7,114,686 | B2 | | 10/2006 | Andrigo |
| 7,387,282 | B2 | * | 6/2008 | Kovac .................... 248/74.4 |
| 7,392,569 | B2 | * | 7/2008 | Sharkey et al. ............ 24/16 R |
| 2003/0105538 | A1 | | 6/2003 | Wooten |
| 2003/0186042 | A1 | | 10/2003 | Dunlap et al. |
| 2005/0116122 | A1 | * | 6/2005 | Nakanishi ............... 248/68.1 |
| 2005/0139732 | A1 | | 6/2005 | Kato |
| 2005/0211853 | A1 | | 9/2005 | Whorton |
| 2005/0278933 | A1 | | 12/2005 | Macke, Jr. et al. |
| 2006/0078455 | A1 | | 4/2006 | Troitski et al. |
| 2006/0236544 | A1 | | 10/2006 | Huskamp et al. |

OTHER PUBLICATIONS

International Search Report of PCT/US2008/058290; Sep. 30, 2008; 11 pages.

* cited by examiner ies and clamp blocks with cylindrical pockets to attach conduit.

METHODS FOR SYSTEM COMPONENT INSTALLATION UTILIZING DIRECT MANUFACTURED COMPONENTS

BACKGROUND OF THE INVENTION

This invention relates generally to manufacturing of composite structures, and more specifically, to methods for system component installation utilizing direct manufactured components.

Components of various systems, for example, components of aircraft systems, are typically installed by attaching such components to a structure of the device into which they are being installed. This attachment is typically accomplished using, for example looped band clamps, or clamp blocks with cylindrical pockets. These clamp examples and other embodiments are sometimes collectively referred to as retention devices. Such retention devices are typically sized to match, for example, an outside diameter of the system components which they are to retain. Examples of these system components include, but are not limited to, one or more of hydraulic lines, electrical conduit, pneumatic lines, and air handling ductwork. These system components, which for ease of illustration and description are collectively referred to herein as conduit, are typically installed by attaching at least a portion of the retention devices to a fuselage or other structure, and then operating the retention device to retain the conduit in a desired position.

One conventional retention method utilizes angle brackets that are attached to a structure of the device into which they are being installed (e.g., the fuselage or other aircraft structure). The angle brackets are oriented in such a manner as to facilitate the routing path of the conduit. Installation of these angle brackets is time consuming as installation usually entails determining a proper location for installation, drilling of fastener holes through the angle bracket and structure, and installation of fasteners through the drilled holes. Typically, attachment of angle brackets to the structure is accomplished utilizing rivet fasteners, though other fasteners may be used. Continuing with the example, plate nuts are mounted on the angle brackets which provide a way to attach respective portion of the looped band clamps or clamp blocks with another fastener, such as a captive screw or bolt. Clamp blocks are typically utilized where a plurality of conduit lines are routed together along the same path. However, these clamp blocks are typically fabricated using a solid metallic material and therefore are not a lightweight solution for conduit restraint. Installation of such retention devices is considered a secondary operation. Secondary operations add costs, time, weight, and usually result in increased part counts.

BRIEF DESCRIPTION OF THE INVENTION

In one aspect, a method for fabricating a structure to include at least a portion of a conduit retention system is provided. The method includes receiving parameters for the structure and the portion of the conduit retention system associated with the structure via a user interface, providing the parameters to a machine configured to fabricate the structure and incorporate the portion of the conduit retention system, the machine using a direct manufacturing process, and operating the machine to integrally fabricate the structure and the portion of the conduit retention system.

In another aspect, a conduit retention system is provided that includes a conduit support saddle formed integrally with a directly manufactured structure, and a conduit clamp configured to engage the conduit support saddle and retain at least one conduit therebetween.

In still another aspect, a conduit retention system is provided. The conduit retention system includes a conduit support saddle comprising at least one substantially semi-circular conduit support area and a relatively flat surface area, and a conduit clamp comprising at least one substantially semi-circular perimeter and at least one clip. The semi-circular conduit support area and semi-circular conduit support area are configured to substantially surround a diameter of a conduit when the at least one clip is engaged with the flat surface area in a snap fit relationship. The conduit support saddle is formed integrally as a portion of a directly manufactured structure.

DETAILED DESCRIPTION OF THE INVENTION

Described herein are methods that fill the need for lightweight and inexpensive composite structures while also reducing a need for the above described secondary operations for the installation and retention of conduit and other "routing" type structures. In practice, utilization of the described methods result in structures that typically include integrally formed saddles that form a portion of a retention mechanism. These retention mechanisms may also include a separately fabricated clamp that attaches to the saddle to retain the conduit in a desired location. Such a retention mechanism provides a lightweight and cost effective solution to the secondary operations that are described above while also reducing the labor needed to install the conduit.

Figure 1:
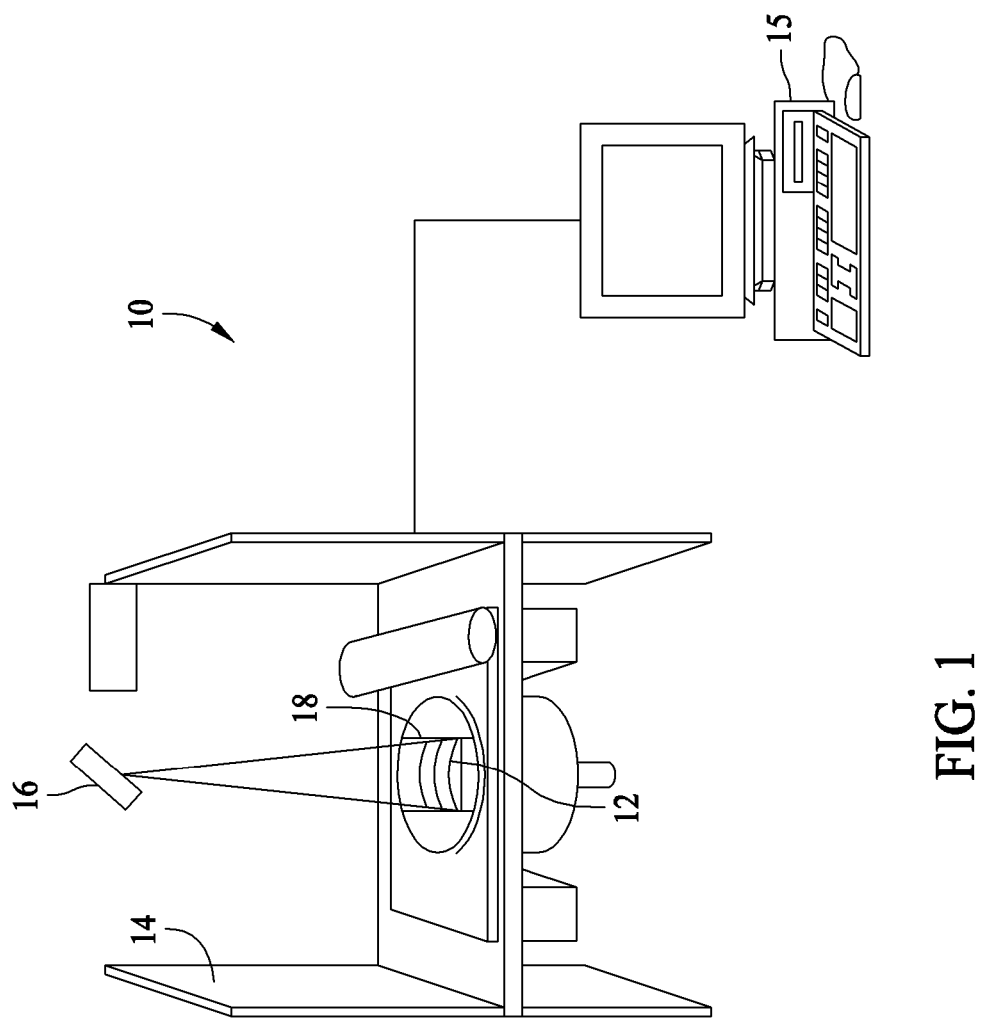
FIG. 1 is an illustration of a system utilized in the direct manufacture of composite structures.

FIG. 1 is an illustration of a system 10 utilized in the direct manufacture of structures 12 in accordance with the methods described herein. In one embodiment, system 10 includes a direct manufacturing assembly 14, for example, a selective laser sintering assembly, to generate the desired structure (or structures) 12 in a single build run which is controlled utilizing a computer assembly 15. At least in the selective laser sintering example, direct manufacturing assembly 14 incorporates a laser 16 to integrally fabricate solid structures within a build chamber 18 during the build run.

Selective laser sintering (SLS) is a process for generating a material from a powdered sintering compound, and is one type of direct manufacturing process. In the SLS process, the powdered compound is distributed onto a surface within build chamber 18, and laser 16, is directed onto at least a portion of the powder, fusing those powder particles together to form a portion of a sintered material. Successive layers of the powder are distributed onto the surface, and the laser sintering process continues, fusing both the particles of the powdered material together into layers and the adjacent layers together, until the fused layers of laser sintered material are of a shape and thickness as appropriate for the intended use of the material.

Through laser sintering of polymer materials, integral features may be incorporated into structures including, but not limited to complex shapes and integrated external features that may be utilized to replace the above described angled brackets and clamping blocks. Although laser sintering has been described, other layer build, or direct manufacturing methodologies are contemplated.

Figure 2:
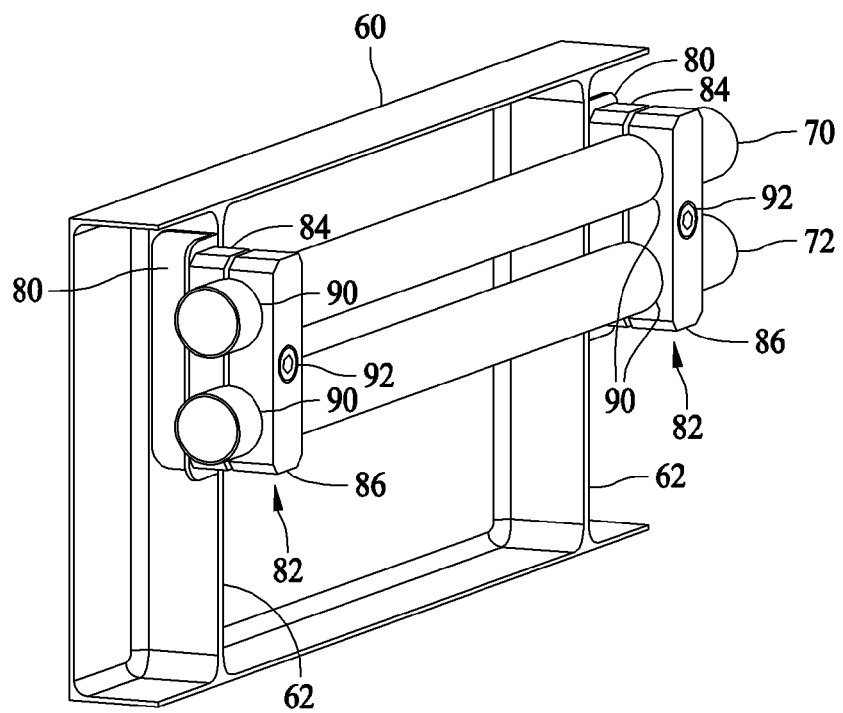
FIG. 2 is an illustration of a retention device which attaches cylindrical members, such as conduit, to a structure.

However, to appreciate the benefits of direct manufacturing and directly manufactured structures, a description of a conventional structure and associated conduit attachment and retention methods is illustrative. To that end, FIG. 2 is an illustration of a fuselage or other similar structure 60 that includes integrally formed ribs 62 that provide strengthening for structure 60. FIG. 2 also includes two hollow cylindrical members 70 and 72. Cylindrical members 70 and 72 are representative of one or more of hydraulic lines, electrical conduit, pneumatic lines, and air handling ductwork which for ease of description are simply referred to herein as conduit. To maintain a position of conduits 70 and 72 they are to be attached to structure 60. To accomplish this attachment, angle brackets 80 are attached to one or more of ribs 62, and clamp blocks 82 consisting of an angle bracket engaging member 84 and a retaining member 86 are attached to each angle bracket 80. As seen from the illustration of FIG. 2, both angle bracket engaging member 84 and retaining member 86 are fabricated with semi-circular indentations 90 in their respective perimeters for holding conduits 70 and 72 in place once installed. Retaining member 86, in the embodiment illustrated, includes a captive fastener 92 which interfaces with angle bracket engaging member 84. As captive fastener 92 is tightened, retaining member 86 is drawn to angle bracket engaging member 84 providing the retention for conduits 70 and 72.

The embodiment of FIG. 2 is one typically utilized retention system. As described above, aircraft systems such as hydraulic lines, electrical conduit, pneumatic lines, and air handling ductwork are typically installed using either looped band clamps or clamp blocks with cylindrical pockets sized to match the tubing or system diameter being retained. Consistent with the illustration of FIG. 2, these conventional attachment methods generally require angle brackets attached to the aircraft structure and oriented in such a manner as to facilitate the routing of the members that are similar to conduits 70 and 72. While described as cylindrical, it is understood that conduits that are retained by these retaining structures may be of nearly any shape. However, angle brackets 80, and similarly functioning devices, typically require time consuming positioning, drilling of fastener holes through the angle bracket and structure, and then installation of fasteners to attach the angle bracket to the structure as above described.

While these methods and structures illustrated by FIG. 2 have suited the needs for restraining routed system components such as conduits 70 and 72, emerging technologies such as the direct manufacturing process described above introduces the possibility of an alternative conduit retention methodology. For example, elegant, lightweight and inexpensive solutions to these otherwise accepted conduit retention conventions may be fabricated utilizing direct manufacturing processes. An example directly manufactured embodiment, similar in function to the conventional structure described with respect to FIG. 2, is further described below. More specifically, the direct manufacturing process utilizes a laser beam, in one embodiment, to sinter a media, or compound, such as titanium or a variety of polymers. Alternatively, the media can include fused polymers deposited in a three-dimensional form as dictated by the definition of the structure(s) to be fabricated.

Figure 3:
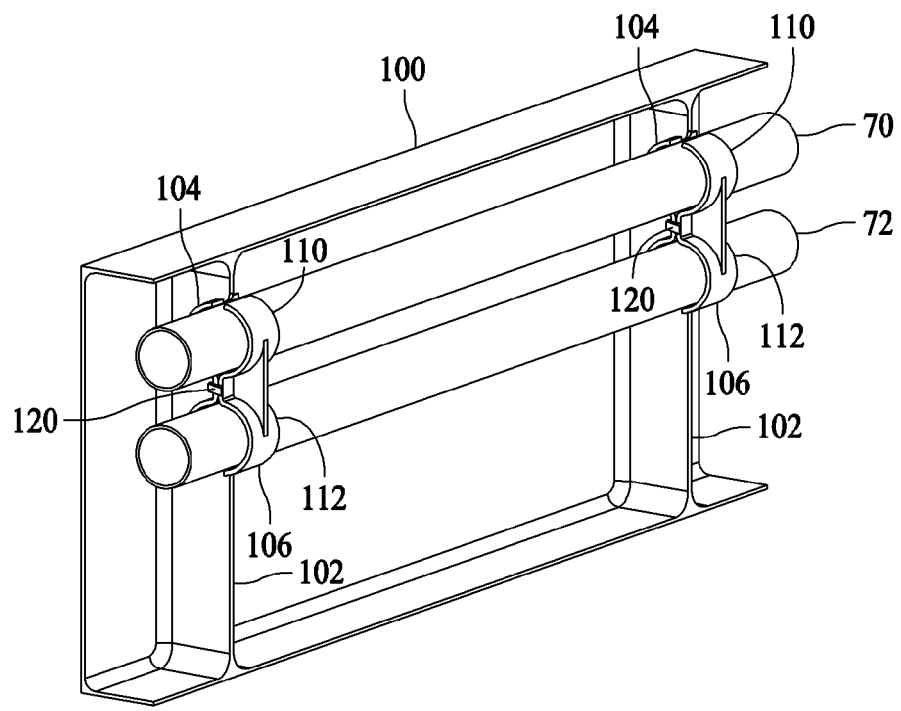
FIG. 3 is an illustration of a structure that includes a portion of a retention device directly manufactured therein.

Particularly, FIG. 3 is an illustration of a structure 100 that includes a portion of a retention device directly manufactured therein. More specifically and as further explained below, ribs 102 of structure 100 are configured with support saddles 104, which in the illustrated embodiment are semi-circular for at least partial insertion and retention of conduits 70 and 72. A conduit clamp 106 also includes one or more substantially semi-circular perimeters 110 and 112 and a clip 120, respectively, for engagement of conduits 70 and 72 and attachment of the conduit clamp 106 to the support saddle 104. In the illustrated embodiment, a clip 120 is included on each side of conduit clamp 106.

Figure 4:
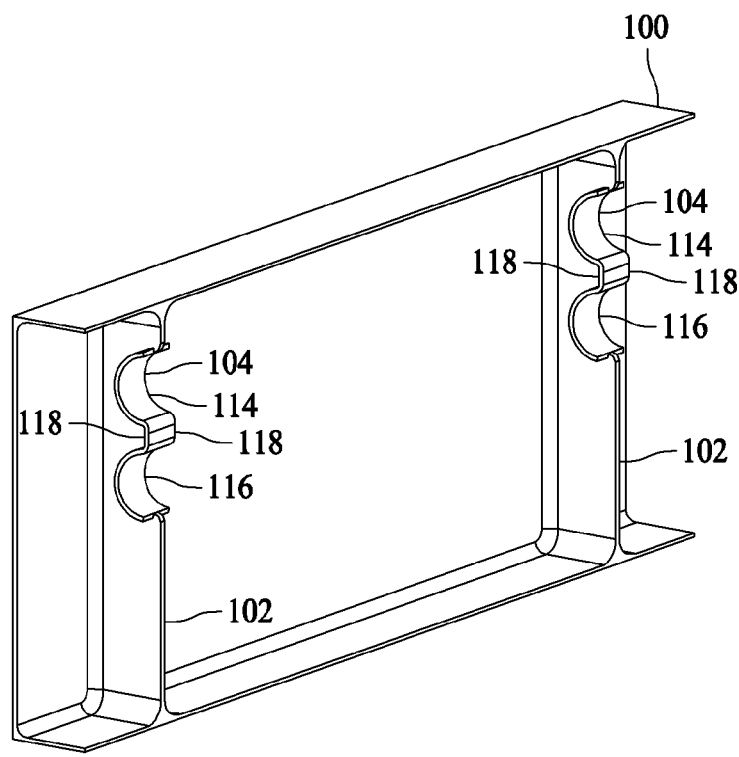
FIG. 4 is an illustration of a structure that includes support saddles directly manufactured as a portion of the structure.

FIG. 4 is a further illustration of structure 100. As inferred above, structure 100 is representative of a portion of an airframe fuselage or other similar structure. FIG. 4 provides a clear view of support saddles 104 which are integrally manufactured as a portion of structure 100. As can be seen in the illustration, support saddles 104 are substantially wider than the ribs 102, thereby providing a larger area of engagement between the conduits (70 and 72) to be supported and the support saddles 104. Referring specifically to support saddles 104, each includes a first conduit support area 114 and a second conduit support area 116 which are substantially semi-circular. Between conduit support areas 114 and 116 is a relatively flat surface area 118 which is utilized for engagement of a clip as further described below. The direct manufacturing process, an example of which is selective laser sintering, can be utilized to integrally fabricate saddles or pockets into a structure that, in conjunction with a conduit clamp, engages and retains in position, for example, conduits 70 and 72, shown in FIG. 3.

Figure 5:
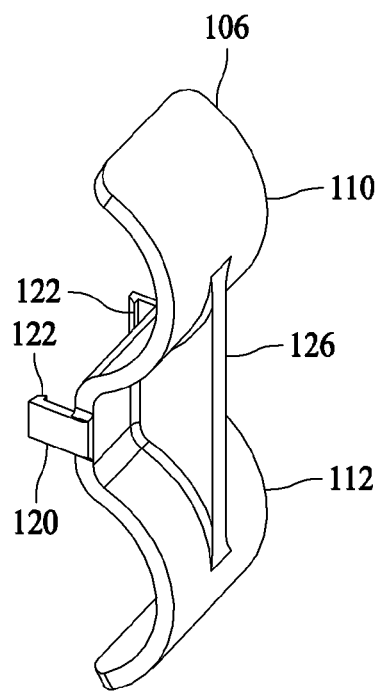
FIG. 5 is an enlarged illustration of a conduit clamp.

FIG. 5 is an enlarged illustration of conduit clamp 106. As described above, conduit clamp 106 includes portions that are semi-circular in cross-section. These portions are referred to herein as semi-circular perimeters 110 and 112 and are configured for retention of conduits 70 and 72. Again, while described herein as semi-circular it is understood that clip 106 may be configured to retain items that have any different cross-sectional shape. Each clip 120 includes a barbed protrusion 122 extending therefrom which is operable for attachment of the conduit clamp 106 to the flat surface area 118 (shown in FIG. 4) of the support saddle 104 between support areas 114 and 116 in a snap-fit relationship. Conduit clamp 106 is strengthened by a rib 126 that extends between an outer diameter of perimeters 110 and 112, substantially down a center of conduit clamp 106. It is to be noted that conduit clamp 106 can also be fabricated using the direct manufacturing techniques described herein.

Figure 6:
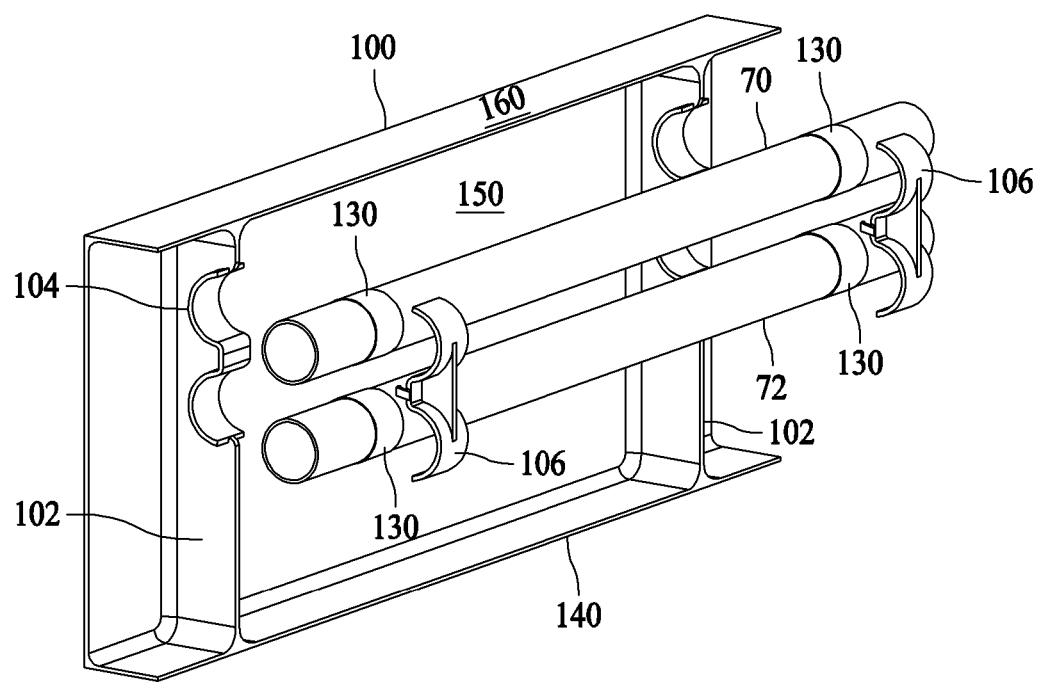
FIG. 6 is an exploded view of the direct manufactured retention system of FIGS. 3-5.

FIG. 6 is an exploded view of the direct manufactured retention system described with respect to FIGS. 3-5. As can be seen, in one embodiment, conduits 70 and 72 are configured with dampening cushions 130 that are "sandwiched" between the conduit support areas 114 and 116 of support saddle 104 and the semi-circular perimeters 110 and 112 of conduit clamp 106. In a specific embodiment, dampening cushions 130 are fabricated from rubber.

With regard to SLS, fabrication of structure 100 is accomplished in successive layers being "sintered" together. Assuming the structure 100 is fabricated from the bottom up, relative to the illustrations shown in the figures, the sintering compound would be distributed in a rectangular pattern within build chamber 18 (shown in FIG. 1), to begin formation of a base 140 of the structure 100. The rectangular distribution of sintering compound and successive sintering continues until base 140 is completed. The distribution of powder gradually is changed until the ribs 102 are being formed along with a back 150 of structure 100. At a certain point the powder distribution is changed to begin fabrication of support saddles 104. Once the layers that include portions of support saddles 104 are completed, the sintering compound is distributed to complete ribs 102 and gradually begin fabrication of a rectangular top 160 of structure 100. The process continues and successive layers are built up until fabrication of the structure 100 is complete. It should be noted that structure 100 could be fabricated in any "direction" including from top to bottom, from front to back, or from back to front, depending on the dimensions of structure 100 and the dimensions of build chamber 18. A similar process is easily applicable to conduit clamp 106, which also may be fabricated through a direct manufacturing process such as SLS.

In an exemplary embodiment, the components described herein are fabricated utilizing selective laser sintering and a powdered compound that is configured to be utilized in the selective laser sintering process. This process allows for fabrication of structures and components that are directly manufactured while also including elegant attachment components that typically cannot be directly manufactured with conventional machining methods. The SLS process allows for sub-components, for example, tubing clamps to be embedded into the structure providing a lower overall profile since there are no angle brackets and additional clamp mechanisms that require space.

The embodiments described herein provide a self-locating and maintainable configuration for attaching parts to the structure of an aircraft, for example. While sometimes described in terms of attaching components to an aircraft or the fuselage of an aircraft, it is understood that the methods are transferable to other applications. The described structures and substructures are manufactured using an additive manufacturing process, which is sometimes referred to as a direct manufacturing process. In the specific embodiments described herein, the receiving structure is directly built into the substructure (e.g., support saddles 104 and structure 100). The mating clamps, (i.e., for example conduit clamps 106) can also be fabricated utilizing an additive manufacturing process.

While the invention has been described in terms of various specific embodiments, those skilled in the art will recognize that the invention can be practiced with modification within the spirit and scope of the claims.

What is claimed is:

1. A conduit retention system comprising:
    a directly manufactured airframe structure comprising at least one strengthening rib;
    a conduit support saddle integrally formed within said at least one strengthening rib, said conduit support saddle and said at least one strengthening rib forming a single directly manufactured device; and
    a conduit clamp configured to engage said conduit support saddle and retain at least one conduit therebetween.

2. A conduit retention system according to claim 1 wherein said conduit support saddle comprises a flat surface area and said conduit clamp comprises at least one clip, each said clip configured to engage said flat surface area in a snap-fit relationship.

3. A conduit retention system according to claim 2 wherein each said clip comprises a barbed protrusion extending therefrom that is operable for attachment of said conduit clamp to said flat surface area.

4. A conduit retention system according to claim 1 wherein the directly manufactured structure and said conduit support saddle are formed integrally utilizing a selective laser sintering process.

5. A conduit retention system according to claim 1 further comprising at least one dampening cushion, said dampening cushion configured for mounting on a section of conduit and further configured for placement between said conduit support saddle and said conduit clamp.

6. A conduit retention system according to claim 1 wherein said conduit support saddle and said conduit clamp, when engaged, form at least one substantial opening with a diameter approximately the same as a diameter of a conduit to be retained by said conduit retention system.

7. A conduit retention system according to claim 1 wherein the directly manufactured structure and said conduit support saddle are fabricated in a single build run on a build chamber utilizing a selective laser sintering process.

8. A conduit retention system comprising:
    a conduit support saddle comprising at least one substantially semi-circular conduit support area and a relatively flat surface area; and
    a conduit clamp comprising at least one substantially semi-circular perimeter and at least one clip, said at least one semi-circular conduit support area and said at least one substantially semi-circular conduit support area configured to substantially surround a diameter of a conduit when said at least one clip is engaged with said flat surface area in a snap fit relationship, said conduit support saddle integrally formed within a portion of a directly manufactured airframe strengthening rib.

9. A conduit retention system according to claim 8 wherein at least one of said conduit support saddle and said conduit clamp are fabricated in a single build run on a build chamber utilizing a selective laser sintering process.

10. A conduit retention system according to claim 8 wherein said conduit support saddle is fabricated to extend from the strengthening rib of the directly manufactured structure.

11. A conduit retention system according to claim 8 wherein each said clip comprises a barbed protrusion extending therefrom that is operable for attachment of said conduit clamp to said flat surface area.

12. A conduit retention system according to claim 8 further comprising at least one dampening cushion, said dampening cushion configured for mounting on a section of conduit and further configured for placement between said conduit support saddle and said conduit clamp.

* * * * *